United States Patent [19]

Daughetee et al.

[11] 3,901,276
[45] Aug. 26, 1975

[54] PNEUMATIC VALVE APPARATUS
[75] Inventors: Calvin C. Daughetee, Arlington; Sidney Z. Winski, Dallas, both of Tex.
[73] Assignee: LTV Aerospace Corporation, Dallas, Tex.
[22] Filed: Jan. 25, 1974
[21] Appl. No.: 436,567

[52] U.S. Cl. ............................................. 137/614
[51] Int. Cl. ........................................... F16k 17/12
[58] Field of Search .......... 137/614, 614.05, 614.06, 137/614.01, 614.02, 614.03

[56] References Cited
UNITED STATES PATENTS
2,887,124  5/1959  Mehl .................. 137/614.06
3,278,205  10/1966  Barlow ................. 137/614 X
3,779,273  12/1973  Stone .................. 137/614.2 X Primary Examiner—Martin P. Schwadron
Assistant Examiner—Robert J. Miller
Attorney, Agent, or Firm—Jack A. Kanz; James M. Cate; H. C. Goldwire

[57] ABSTRACT

Disclosed is a pneumatic launch apparatus which employs separable telescoping tubes. The open ends of the tubes are provided with valves which automatically close upon separation of the tubes to trap operating gas in the tubes at the moment of separation.

11 Claims, 5 Drawing Figures

PNEUMATIC VALVE APPARATUS

This invention relates to pneumatic launching apparatus. More particularly it relates to pneumatically operated launching apparatus including a pair of separable telescoping tubes having means for closing the open ends of each of the telescoping tubes simultaneously or nearly simultaneously with separation of the tubes.

Telescopically arranged tubes having a slideable seal therebetween and employing a high pressure gas source have long been used as a simple effective launch system. Either the inner tube or the outer tube is attached to or constitutes the launched vehicle and the other tube is rigidly mounted to act as the launcher. A pressurized gas such as air, nitrogen or the like is injected into the inner tube. Expansion of the gas propels the missile until the tubes separate.

It will be apparent that upon separation of the tubes the pressurized gas within both tubes will be vented directly to atmosphere. Obviously, if the pressure in the separating tubes at the point of separation is greater than atmospheric, an acoustic shock will be generated as the pressurized fluid is released. The intensity of noise generated will depend, of course, upon the pressure and volume of gas and the cross-sectional area of the open ends of the tubes.

Pneumatic launch systems of the general configuration described are frequently used to rapidly accelerate bodies in research and development applications to simulate transient conditions so that physical characteristics of the missile during such transient conditions or the interaction of other bodies with the missile during such transient conditions may be observed. A typical application of such pneumatically launched test apparatus is used in the aircraft industry to simulate transient stress on aircraft landing gear caused by impact thereof on a runway or carrier deck. For this purpose the landing gear to be tested is usually mounted in a vertically moveable test rack and a simulated carrier deck moved substantially horizontally through the test rack at aircraft approach and landing speeds. The landing gear is lowered to contact the moving deck, thereby simulating landing of the aircraft on a stationary deck. If desired, of course, the landing gear under test may be moved over a stationary deck in a similar manner.

It will be apparent that to effectively simulate the effect of aircraft landing on a carrier deck, relative speeds up to 130 knots must be attained. Furthermore, since the moving deck must be sufficient to withstand the impact of a landing gear simulating an aircraft of gross weight of up to 60,000 pounds approaching at a speed of up to 130 knots, the simulated deck must be rather substantial and may weigh as much as 2 tons or more.

Acceleration of such a large mass to such high velocities in reasonably short distances obviously requires a relatively powerful launcher. Typically a launcher of this type may be comprised of one or more pairs of telescoping tubes, the inner tube having an outer diameter of as much as 7.5 inches or more and a length of as much as 22 feet or more. To accelerate 2 tons of simulated carrier deck to the desired velocity, operating pressures of as high as 2000 psi or greater may be used. It will be apparent that upon separation of the tubes a large pressure differential exists between the interiors of the separating tubes and the surrounding atmosphere and a large volume of gas may be released.

Unless the open ends of the tubes are closed simultaneously with or immediately after separation, the pressurized gas in each tube will be vented directly to atmosphere. Obviously, the sudden release of a large volume of pressurized gas through a large opening causes a sensational acoustic shock. In fact, the shock may be so severe as to be damaging to the human ear as well as endangering other test equipment and structures in the immediate vicinity. Furthermore, the vented gas is lost to the environment and, when the launcher is reassembled for use it must be repressurized. Repressurizing from atmospheric pressure to operating pressure is not only time consuming, but wastes considerable energy and, where gases other than air are used, wastes large volumes of the pressurizing gas.

In accordance with the present invention, apparatus is provided for closing the open ends of both telescoping tubes immediately upon separation thereof to prevent the loss of pressurizing gas and therefore avoid the generation of a severe acoustic shock. The closure devices comprise a mechanically actuated flap valve carried within an enlarged extension of the open end of the outer tube and a pneumatically operated valve carried within the open end of the inner tube. The flap valve for closing the end of the outer tube is actuated by camming plates positioned adjacent the open end of the inner tube to activate the flap valve immediately upon separation of the telescoping tubes. The pneumatically operated valve carried within the inner tube is activated by the pneumatic pressure within the inner tube when the outer tube passes over a control vent releasing gas from a control chamber in the pneumatic valve to atmosphere. Accordingly, the open ends of both tubes are automatically closed immediately upon separation of the telescoping tubes, thereby containing all pressurizing gas within the tubes except for a relatively small amount lost through leakage at the moment of separation.

It will be observed that by closing the open ends of both tubes immediately upon separation, the pressurized gas therewithin is contained, thus preventing loss of a major portion of the pressurizing gas. Preventing loss of the pressurizing gas also substantially reduces the acoustic shock generated upon separation of the pneumatically powered tubes and substantially reduces repressurization time required for repressurizing the apparatus for subsequent use. Other features and advantages of the invention will become more readily understood from the following detailed description taken connection with the appended claims and attached drawings in which:

Figure 1:
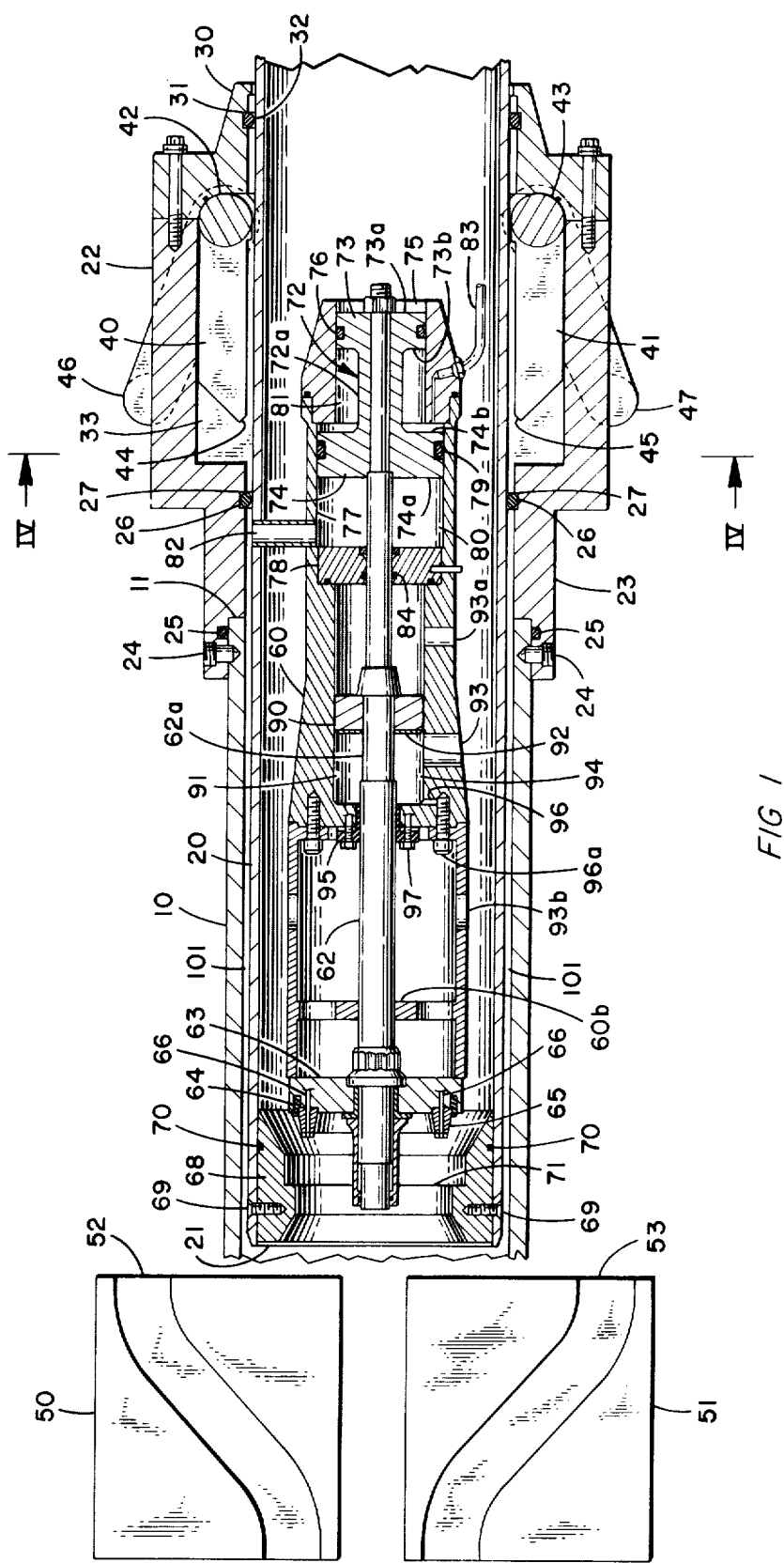
FIG. 1 is a sectional view of the end closure system of the invention with both end closure valves in the open condition prior to separation of the tubes.

As illustrated in FIG. 1 the preferred embodiment of the invention comprises an elongated first or outer tube 10 having an enclosed end (not shown) and an open end 11. A second or inner tube 20, having an enclosed end (not shown) and open end 21, is telescopically arranged within the outer tube 10 so that the open end 21 of the inner tube is slideable through the length of the outer tube 10.

In the preferred embodiment the tubes 10 and 20 are cylindrical and outer tube 10 carries a valve housing, preferably a rectangular box 22 on the open end thereof. The box 22 is attached to the open end of the outer tube 10 by means of a cylindrical collar 23 and appropriate sealing means such as screws 24 and sealing gasket 25, thus forming an extension of the open end of the outer tube.

To provide slideable sealing engagement between the telescoping tubes a gasket 26, such as an O-ring or the like, is carried within an annular recess 27 in either the collar 23 (as illustrated) or within the inner surface of the outer tube 10. It will thus be observed that in the configuration shown in FIG. 1 the telescopically arranged tubes 10 and 20 form an expandable chamber having a minimum volume when the inner tube 20 is telescopically inserted its full length into the outer tube 10 and having a maximum volume when the sealing gasket 26 carried in the outer tube is coincident with the open end 21 of the inner tube 20.

Rectangular box 22 preferably carries a second cylindrical collar 30 on the opposite end thereof having an annular groove 31 therein carrying a sealing gasket 32, such as an O-ring, to form a closed annular rectangular chamber 33 within the rectangular box 22.

Figure 4:
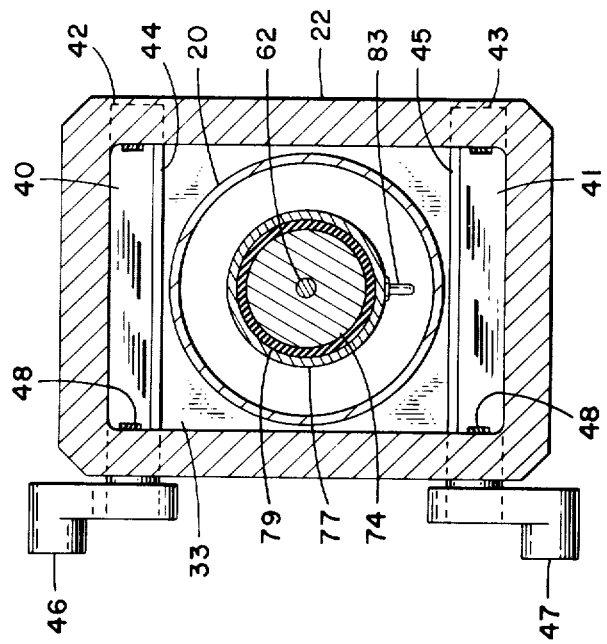
FIG. 4 is a sectional view of the apparatus of FIG. 1 taken through the line IV—IV.
Figure 5:
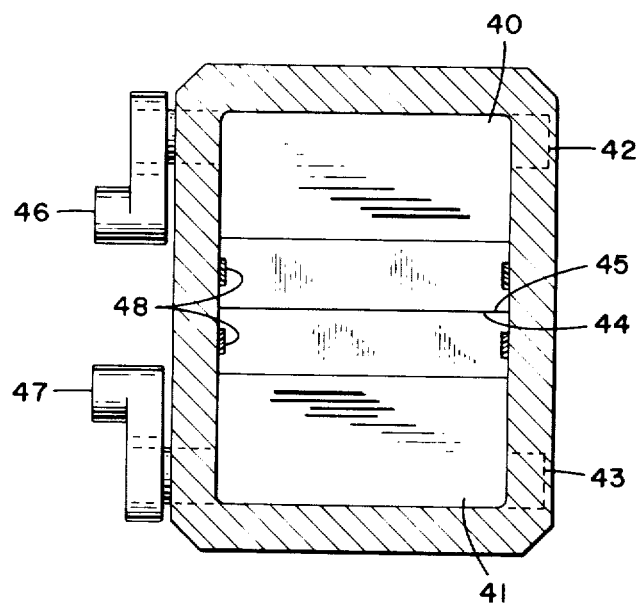
FIG. 5 is a sectional view of the outer tube of FIG. 1 showing the outer tube closure valve in the closed position.

As illustrated in FIGS. 1, 4 and 5 a pair of flaps 40 and 41 are mounted within the rectangular box 22 by parallel transverse pivot pins 42 and 43, respectively. Flaps 40 and 41 are preferably rectangular and have mating end faces 44 and 45, respectively. The pivot pins 42 and 43 project through one side of the rectangular box 22 and are attached to cranks 46 and 47. The transverse parallel pins 42 and 43 are mounted toward the open end of the box so that the flaps, in the open condition, extend parallel to the axis of the tubes and from the open end toward the closed end of the outer tube 10. Flaps 40 and 41 carry sealing gaskets 48 on the edges thereof which slideably sealingly engage the inner walls of the rectangular box 22.

As shown in FIG. 1 a pair of camming plates 50 and 51 are mounted adjacent the open end of the inner tube 20. The plates 50 and 51 have converging channels 52 and 53 therein aligned to receive the ends of cranks 46 and 47, respectively, as the outer tube 10 moves laterally (to the left as shown in FIG. 1). It will thus be observed that when the gasket 26 passes over open end 21 of the inner tube 20 cranks 46 and 47 will engage channels 52 and 53, respectively. As the outer tube continues to move laterally the cranks, following channels 52 and 53, converge rotating flaps 40 and 41 to the closed position as shown in FIG. 5. Since the sealing gaskets 48 sealingly engage the wall surfaces of the box 22, the outer tube will be closed when the mating faces 44 and 45 converge, thereby closing the open end of the outer tube. It should also be observed that since the box 22 forms an extension of the outer tube 10, the flaps may be closed while the sealing gasket 32 is still in contact with the inner tube 20. Since the extension formed by box 22 becomes part of the expanding volume, the flaps may be closed simultaneous with or even slightly before separation of the tubes, thereby minimizing the loss of pressurization gas from the outer tube during the closing sequence.

Referring to FIG. 5 it will be observed that flaps 40 and 41 only rotate approximately 45° in moving from the open position to the closed position. Therefore when the flaps are closed the pressure within the outer tube is exerted on the inner surfaces of the flaps and force the mating surfaces 44 and 45 together. The flaps, therefore, are held in the closed position by the pressure within the outer tube after separation of tubes 10 and 20.

Figure 3:
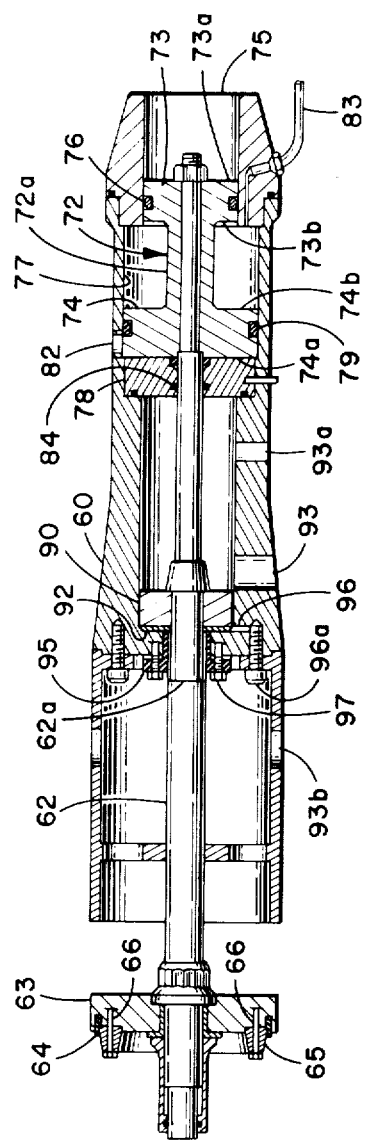
FIG. 3 is a sectional view of the inner tube closure valve mechanism in the closed position.
Figure 2:
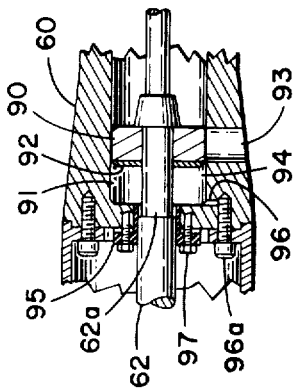
FIG. 2 is a fragmentary sectional view of the inner tube closure valve damping system during transition from open to closed condition.

The preferred embodiment of the mechanism for closing the open end of the inner tube 20 is illustrated in FIGS. 1, 2 and 3. The apparatus comprises a cylindrical body 60 coaxially mounted within the inner tube 20 near the open end thereof by means (not shown) permitting substantially unrestricted gas flow therearound.

A shaft 62 is slideably journaled for reciprocal movement coaxially within the body 60. A disc-like valve plate 63 is mounted on the end of shaft 62 nearest the open end of the inner tube 20. A resilient sealing gasket 64 is secured to the outer face of the periphery of valve plate 63 by retainer 65 and mounting screws 66.

An annular valve seat body 68 is mounted within the open end 21 of the inner tube 20 by appropriate means such as screws 69 to define a wide aperture coaxial with the tube 20. A gasket 70 forms a gas-tight seal between the valve seat body 68 and the inner surface of inner tube 20. The valve seat body 68 carries an inwardly projecting annular shoulder 71 adapted to mate with sealing gasket 64 when the valve is in the closed position. It will thus be observed that when the valve plate 63 is moved to the left as shown in FIGS. 1 and 3 the sealing gasket 64 will mate with the shoulder 71 to seal the open end of the inner tube 20.

The opposite end of shaft 62 carries a double-ended piston 72. The double-ended piston 72 is in the general shape of a spool having a cylindrical shank 72a with radially extending flanges 73 and 74 on opposite ends thereof. The flanges 73 and 74 are of different diameters, the smaller diameter flange 73 positioned at the end of shaft 62. Flange 73 is adapted for reciprocal movement within an open-ended cylinder 75. A gas-tight slideable seal is provided between flange 73 and the walls of cylinder 75 by gasket 76.

Flange 74 is adapted for reciprocal movement in cylinder 77 which is coaxial with cylinder 75 but of larger diameter. A gas-tight slideable seal is provided between flange 74 and the walls of cylinder 77 by gasket 79. The end of cylinder 77 opposite flange 74 is enclosed by end plate 78. Shaft 62 is slideable through end plate 78 and a gas-tight seal is provided therebetween by gasket 84. It will thus be observed that the outer face 74a of flange 74, coacting with the walls of cylinder 77 and end plate 78, defines a variable volume control chamber 80. Likewise, the inner face 74b of flange 74, the walls of cylinders 77 and 75, and the inner face 73b of flange 73 define a variable volume chamber 81. Although the distance between flanges 73 and 74 is fixed, the volume of chamber 81 is variable because of the different diameters of cylinders 75 and 77.

Control chamber 80 is vented to the external surface of the inner tube 20 by means of control vent 82. Annular chamber 81 is vented to atmosphere by means of vent line 83 which extends the full length of inner tube 20 and is vented through the closed end (not shown) of inner tube 20.

For operation the inner tube 20 is inserted within outer tube 10 as shown in FIG. 1 and the tubes telescoped until the open end 21 of inner tube 20 is adjacent the closed end of the tube 10, thereby forming a chamber of minimum volume. The outer tube is latched in this position and the interior of inner tube 20 charged with pressurized air, nitrogen or other suitable gas through an entry port in the closed end (not shown). The valve in the open end 21 is open during pressurization. Pressurized gas fills the interior of the inner tube 20 and, since the inner valve is open, the space 101 between the inner and outer tubes. It will thus be observed that when the tubes are telescoped pressurizing gas will fill the space 101 between the tubes and enter the control chamber 80 through control vent 82, thus maintaining the same pressure in the control chamber 80 and the interior of inner tube 20. Since the surface area of piston face 74a is greater than the surface area of piston face 73a, and since chamber 81 is vented to atmosphere, pressurization of the inner tube 20 will pressurize control chamber 80 and force shaft 62 toward the open position (to the right as shown in FIG. 1) maintaining the valve in the open position.

When the desired operating pressure is reached the outer tube 10 is released. When the outer tube is released the pressurized gas expands, propelling the outer tube 10 to the left as shown in FIG. 1. However, since gasket 26 maintains sealing contact with the outer surface of the inner tube 20, the expanding gas is contained in the expanding chamber defined by the inner tube 20 and the outer tube 10.

As the pressurized gas expands the outer tube 10 is accelerated and moves toward the end of the inner tube 20. The pressure of the gas decreases as the volume expands. However, since the space 101 between inner tube 20 and outer tube 10 remains part of the expanding chamber, the pressure in control chamber 80 remains the same as that in the interior of inner tube 20. Therefore the pressure exerted on the outer face 74a of the larger flange 74 of the double-ended piston is greater than the pressure exerted on the outer face 73a of the opposite end of the double-ended piston so long as the pressure in the interior of the inner tube 20 is greater than atmospheric and chamber 81 is vented to atmosphere. Therefore, the valve in the inner tube is maintained in the open condition. However, when gasket 26 passes over the control vent 82, control chamber 80 is vented to chamber 33 within the rectangular box 22. The pressure in chamber 33 is essentially atmospheric, thus the control chamber 80 is vented to atmosphere and the pressure on the outer surface 73a of the smaller diameter flange 73 becomes greater than the pressure on the outer surface 74a and the shaft 62 is moved to the left to seat sealing gasket 64 against valve seat body 68, closing the end of the inner tube 20. Since the chamber 81 is vented to atmosphere by way of vent line 83 no pressure change occurs therein. Accordingly, the pressure exerted on end face 73a forces the valve toward closed position and maintains the sealing gasket 64 in sealing contact with shoulder 71.

Since the gasket 26 passes over the control vent 82 before the outer tube 10 separates from the inner tube 20, closure of the end of inner tube 20 may occur simultaneous with the actual separation of the tubes or even slightly before separation of the tubes.

It will be observed that when the control chamber 80 is vented to atmosphere the pressure exerted on outer surface 73a of the double-ended piston 72 may be sufficient to cause extremely rapid closure of the inner valve. Moreover, when high pressures such as 2000 psi are used, acceleration of the valve plate 63 toward closure may be so rapid as to damage the sealing gasket 64 when it strikes the shoulder 71. Furthermore, since sealing gasket 64 is of resilient material such as rubber, the valve may not seat immediately but tend to bounce and return to the open position. Because of the large area opening of the valve, the loss of gas during a single bounce may be so great as to lower the pressure in the interior of inner tube 10 sufficiently to prevent a second closure of the valve. Therefore, in order to insure rapid and positive closure of the valve without damaging the sealing gasket or the valve seat and to prevent the valve plate from bouncing from the valve seat, damping system is provided which decelerates the shaft as the sealing gasket 64 approaches the valve seat shoulder 71. The preferred embodiment of the deceleration mechanism is illustrated in FIGS. 1, 2 and 3.

As illustrated in FIG. 1, a damping piston 90 is carried on shaft 62 for reciprocal movement with a cylinder 91 formed within the valve body 60. Sealing engagement between the damping piston 90 and the walls of cylinder 91 is provided by sealing gasket 92 carried on the damping piston 90. A port 93 provides fluid commmunication between the chamber 94, defined by the walls of cylinder 91 and damping piston 90, and the interior of inner tube 20. The port 93 is positioned so that the port is unobstructed when the valve is in the open position (the shaft 62 moved to the far right as shown in FIG. 1) but obstructed by the piston 90 when the valve plate 63 has moved approximately one-half the distance from the open position to the closed position.

Shaft 62 extends through the end of the damping cylinder 91 and a gas tight seal therebetween is formed by an adjustable sealing bushing 95. The diameter of the portion 62a of shaft 62 immediately adjacent to the damping piston 90 is of reduced diameter. The axial length of portion 62a is at least as great as the axial length of sealing bushing 95.

It should be observed that in the embodiment illustrated, the damping chamber 94 is coaxial with the control chamber 80. Therefore, the cylindrical body 60 defining the separate chambers must be vented in appropriate areas to avoid formation of enclosed chambers which would adversely affect operation of the valve. Accordingly vent 93a is provided in the wall of body 60 between the end plate 78 and damping piston 90 permitting the pressure within the interior of the inner tube 20 and the back side of damping piston 90 to remain equal at all times. Likewise, since shaft 62 is journaled in the end 60b of body 60, the space between end 60b and the end of chamber 94 forms a chamber which must be vented to the interior of the tube 20 by suitable means such as vent 93b.

Damping chamber 94 is provided with a relief vent 96 which is partially obstructed by adjustable screw 96a allowing controlled release of gas trapped in the damping chamber 94 to the interior of the inner tube 20 through vent 93b.

It will thus be observed that when sealing gasket 26 passes control vent 82, gas within the control chamber 80 will be vented to atmospheric pressures and the pressure within the interior of inner tube 20 will be exerted on the outer face 73a of the double-ended piston 72, moving shaft 62 and the valve plate 63 toward the closed position. As the shaft 62 moves toward the closed position damping piston 90 obstructs port 93, thereby trapping gas in damping chamber 94. Therefore, as pressure is exerted on piston outer face 73a the gas trapped in damping chamber 94 is compressed. Unless the damping chamber 94 is vented, the pressurized gas therein will prevent closure of the valve. It will be observed, however, that port 93 is positioned so that shaft 62 and valve plate 63 will have moved approximately one-half the distance from the open position to the closed position before port 93 is obstructed. At this point the shaft and valve plate will have attained a high velocity which, if unchecked, may cause damage to the sealing gasket 64 upon impact with the seat shoulder 71. However, as soon as damping piston 90 blocks port 93, the gas trapped in chamber 94 is compressed by further movement of the shaft and piston 90. Compression of the trapped gas in chamber 94 serves to retard movement of the shaft 62. The gas trapped in chamber 94, however, is allowed to escape therefrom at a controlled rate into inner tube 20 through relief vent 96. The progress of the valve plate toward the closed position is therefore retarded but not stopped.

To insure positive seating of the sealing gasket 64 on valve seat shoulder 71, the gas remaining in chamber 94 must be vented when the valve approaches the closed position. It will be observed that as the shaft 62 passes through the bushing 95 sealing contact is maintained therebetween. However, when the reduced diameter portion 62a passes completely through the bushing 95, sealing contact therebetween is lost and all remaining gas trapped in chamber 94 is immediately dumped, releasing all back pressure on damping piston 90 and thereby insuring positive seating of sealing gasket 63 on seat shoulder 71. Sealing bushing 95 is preferably adjustable by means of adjustment screws 97 so that the relative position thereof may be adjusted to accommodate various operating pressures within the system. Likewise, relief valve screw 96a is also adjustable to vary the leakage rate from chamber 94 to accommodate the various operating pressures and to vary closure rates.

It will be observed that when the reduced diameter portion 62a has passed completely through the adjustable bushing 95, all pressure in the chamber is immediately released and the damping system has no further effect on the valve. Therefore the pressure exerted on the outer face 73a of the double-ended piston is transmitted directly to the sealing surfaces of the closure valve ensuring positive contact between sealing gasket 64 and valve seat shoulder 71.

It will be observed that the closure valves described operate automatically upon separation of the tubes to close the open ends effectively simultaneously with separation. Therefore little, if any, of the pressurizing gas is allowed to escape. Since the gas is not permitted to escape, the acoustic noise normally generated by the separating pneumatic tubes is eliminated and the gas trapped in the tubes is not lost.

While the invention has been described with particular reference to a specific launch apparatus, it will be readily appreciated that the invention is not so limited. The principles disclosed are equally applicable to various other pneumatically operated devices employing separable telescoping tubes and may be used in the same manner in hydraulic systems. It is to be understood, therefore, that although the invention has been defined with particular reference to a specific embodiment thereof, the form of the invention shown and described in detail is to be taken as the preferred embodiment of same, and that various changes and modifications may be resorted to without departing from the spirit and scope of the invention as defined by the appended claims.

What is claimed is:

1. Pneumatic launch apparatus comprising:
   a. first and second elongated tubes, each tube having an open end and an enclosed end, the open end of said second tube adapted to be telescopically slideable through the open end of said first tube;
   b. means for closing the open end of said second tube upon separation of said first and second tubes; and
   c. means for closing the open end of said first tube upon separation of said first and second tubes, said means for closing the open end of said first tube comprising:
      valve housing means forming an extension of the open end of said first tube,
      flap means with mating end faces pivotally mounted within said valve housing means operable to move from an open position to a closed position sealingly closing the open end of said first tube in said closed position,
      crank means operably interconnected with said flap means and extending from said valve housing means, and
      camming means mounted adjacent the open end of said second tube operable to engage said crank means and move said flap means from said open position to said closed position.

2. Pneumatic launch apparatus comprising:
   a. first and second elongated tubes, each tube having an open end and an enclosed end, the open end of said second tube adapted to be telescopically slideable through the open end of said first tube;
   b. means for closing the open end of said second tube upon separation of said first and second tubes; and
   c. means for closing the open end of said first tube upon separation of said first and second tubes, said means for closing the open end of said first tube comprising:
      box means forming an extension of the open end of said first tube,
      flap means with mating end faces pivotally mounted within said box means operable to move from an open position to a closed position sealingly closing the open end of said first tube in said closed position,
      crank means operably interconnected with said flap means and extending from said box means, and
      camming means mounted adjacent the open end of said second tube operable to engage said crank means and move said flap means from said open position to said closed position.

3. Apparatus as defined in claim 2 wherein said flap means comprises a pair of opposed rectangular flaps with mating end surfaces, said flap means pivotally mounted at the ends opposite said mating surfaces and extending into said box means from the open end thereof when in said open position.

4. Apparatus as defined in claim 2 including an annular collar forming the open end of said box means, said annular collar including means for providing slideable sealing engagement between said annular collar and said second tube.

5. Pneumatic launch apparatus comprising:
   a. first and second elongated tubes, each tube having an open end and an enclosed end, the open end of said second tube adapted to be telescopically slideable through the open end of said first tube;
   b. means for closing the open end of said first tube upon separation of said first and second tubes, and
   c. means for closing the open end of said second tube upon separation of said first and second tubes, said means for closing the open end of said second tube comprising:
      an annular valve seat body mounted within the open end of said second tube having a central opening therein with an inwardly projecting annular shoulder,
      a shaft mounted coaxially within said second tube for reciprocal movement between first and second positions,
      a valve plate mounted on said shaft and adapted to mate with said valve seat body to sealingly close the end of said second tube when said shaft is in said second position,
      a double-ended piston mounted on said shaft, said double-ended piston comprising first and second flanges radially extending from said shaft and adapted for reciprocal movement within first and second cylinders, respectively, the diameter of said first cylinder being larger than the diameter of said second cylinder, said first flange and said first cylinder defining a control chamber having a maximum volume when said shaft is in said first position and a minimum volume when said shaft is in said second position, said first flange, said first cylinder, said second flange and said second cylinder defining a variable volume relief chamber having a minimum volume when said shaft is in said first position and a maximum volume when said shaft is in said second position, and the face of said second flange being exposed to the pressure of the gas within said second tube,
      relief vent means for maintaining atmospheric pressure within said relief chamber, and
      control vent means providing fluid communication between said control chamber and the exterior of said second tube near the open end thereof.

6. Apparatus as defined in claim 5 wherein said relief vent means comprises a conduit extending from said relief chamber through the closed end of said second tube, thereby providing fluid communication between said relief chamber and the atmosphere surrounding said apparatus.

7. Apparatus as defined in claim 5 including damping means for controlling the rate of movement of said shaft from said first position to said second position.

8. Apparatus as defined in claim 7 wherein said damping means comprises:
   a. a damping piston carried on said shaft and adapted for reciprocal movement within a cylinder having an enclosed end and an open end and defining a damping chamber having a maximum volume when said shaft is in said first position and a minimum volume when said shaft is in said second position,
   b. means providing slideable sealing engagement between the walls of said damping chamber and said damping piston,
   c. a port providing fluid communication between the interior of said second tube and said damping chamber, said port positioned to be obstructed by said damping piston after said shaft has moved approximately one-half the distance between said first position and said second position, and
   d. vent means for controllably venting fluid from said damping chamber as said shaft moves from said first position to said second position.

9. Apparatus as defined in claim 8 wherein said vent means for controllably venting fluid from said damping chamber comprises a threaded aperture and a screw fitted therein for adjustably varying the rate of flow of fluid therethrough.

10. Apparatus as defined in claim 8 wherein said shaft passes through the enclosed end wall of said damping chamber and including means for maintaining sealing contact between the end wall of said damping chamber and said shaft at all times except when said shaft is in said second position.

11. Apparatus as defined in claim 10 wherein said means for maintaining sealing contact between the end wall of said damping chamber and said shaft comprises a sealing bushing mounted in said end wall adapted to conform to the diameter of said shaft when said shaft is in said first position and a region of reduced diameter of said shaft coinciding with said bushing when said shaft is in said second position.

* * * * *